United States Patent Office

2,919,474
Patented Jan. 5, 1960

2,919,474

MOLDABLE POLYETHYLENE

Quintin P. Cole, Pittsfield, Mass., assignor to General Electric Company, a corporation of New York No Drawing. Application January 27, 1956
Serial No. 561,937

8 Claims. (Cl. 18—59)

This invention is concerned with the treatment of chemically cross-linked polyethylene to render it moldable to give products of improved infusibility and insolubility. More particularly the invention relates to chemically cross-linking polyethylene (either alone or with fillers or other modifying agents), and thereafter subjecting the cross-linked polyethylene to a milling action to obtain a product which can be readily molded, for instance, compression molded, extruded (over electrical conductors such as copper, aluminum, copper alloys, etc.), pressed or calendered into tapes and sheets, etc., thus yielding products which have reduced fusibility characteristics (e.g., at temperatures of 120 to 150° C.) and improved solvent resistance as well as improved resistance to stress cracking especially in the presence of certain chemical media.

It is well known in the past that polyethylene can be cross-linked by means of various peroxides, for instance, benzoyl peroxide, tertiary butyl perbenzoate, di-alpha-cumyl peroxide, etc. When thus chemically cross-linked, the polyethylene compositions thereby obtained have greatly improved form stability at elevated temperatures, increased solvent resistance (for instance, to boiling toluene), and resistance to stress-cracking properties in the presence of certain materials. Although such chemically cross-linked polyethylene materials may find use in the various arts, including the enclosure art, insulating art, and packaging art, etc., nevertheless, there are many applications in which it is desirable that the polyethylene having the properties of cross-linked polyethylene be capable of being further molded (the term "molded" or "molding" is intended to include hereinafter all molding operations whether by compression molding, injection molding, extrusion, tape or sheet forming, calendering, etc.) into other articles as well as by dip coating, casting, etc. For instance, it is often desirable to take polyethylene molding powder and subject it to different molding operations such as injection molding, extrusion (for insulating purposes), compression molding, etc., to form objects of various shapes and sizes which have good heat and solvent resistance similar to the same properties obtained by chemically cross-linking preformed polyethylene articles.

Heretofore it was believed that after chemically cross-linking (or vulcanizing) the polyethylene, no further useful deformation, that is molding, of the polyethylene could be obtained after the cross-linking step. This belief has been a limiting feature of cross-linked polyethylene in employing the latter for many of the wide applications for which polyethylene has been found so useful up to the present time.

Unexpectedly I have found that polyethylene can be chemically cross-linked and thereafter can be readily molded into useful articles of manufacture employing the various types of molding apparatus used in molding operations, for instance, flame spraying, compression molding, blow molding, extruding, injection molding, calendering, etc. These desirable objectives and unexpected advantages of moldability accompanied by reduced fusibility and increased insolubility in the finally molded state can be obtained if prior to the aforesaid molding operations, the chemically cross-linked polyethylene is subjected to a shearing or masticating action similar to the intensive mechanical deformation obtained on the usual milling rolls.

The chemically cross-linked polyethylene may be obtained in various ways. A small amount of cross-linking or vulcanizing agent which is usually of an organic nature, for instance, organic peroxides in amounts ranging from about 0.5 to about 8 to 10% or more by weight, based on the weight of the polyethylene, is milled or otherwise suitably incorporated in the polyethylene and the polyethylene heated at temperatures ranging for instance, from about 75° to 200° C. to obtain a chemically cross-linked polyethylene. Obviously, the degree of cross-linking may be varied widely depending upon such conditions as the type of curing agent employed, the proportion of curing agent, the temperature at which curing is effected, etc. Generally, the degree of cure is not too critical and optimum conditions can be readily determined by a minimum of effort. I have found that after incorporation of the peroxide curing agent, if such is used, the mixture of ingredients is advantageously heated at a temperature of about 125 to 200° C. for times ranging from about 15 seconds to about 60 minutes to effect curing of the polymer by the action of the peroxide. Obviously, the physical state in which the polyethylene is cured or vulcanized may be also varied widely and thus may be in the form of sheet material, particles, cubes, spheres, etc.

It is usually desirable that the degree of cross-linking should not be so high as to render the polyethylene incapable of milling to produce a readily moldable, for example, extrudable product. The determination of the optimum conditions in this respect is, of course, important. However, persons skilled in the art will have little difficulty in determining this, especially in view of the examples described below. In general, it might be advisable to mention that the amount of peroxide used should not be too large nor should the time of heating be excessive. Of additional importance in determining the proper conditions for cross-linking the polyethylene, consideration should be given to the molecular weight of the polyethylene prior to cross-linking since polyethylenes having higher original molecular weights require smaller amounts of cross-linking agents than do polyethylenes of lower molecular weights to yield the same properties in the cross-linked and milled polyethylene, namely, the desired high temperature form stability and solvent resistance after the milling operation. Generally, the minimum amount of peroxide required to impart the desired form stability and solvent resistance varies substantially inversely to the original molecular weight of the polyethylene.

The polyethylene referred to herein is a polymeric material, usually solid, formed by the polymerization of ethylene at elevated temperatures and pressures, although there are presently processes which employ low temperatures and pressures for making the polyethylene. The polyethylene may range in molecular weight from about 12,000 to about 16,000 to 30,000 or more for a solid form of the polyethylene when measured by the intrinsic viscosity method. It is more particularly described in U.S. Patent 2,153,553 and in Modern Plastics Encyclopedia, New York (1949), pages 268–271. Examples of commercially available polyethylene which can be employed in the practice of the instant invention are polythene DYNH sold by the Bakelite Corporation, Boundbrook, New Jersey; Du Pont polyethylene resin sold under the tradename "Alathon," its properties, uses, etc., being set forth in Du Pont's Information Bulletin A-3584 published by the Du Pont Polychemicals Department; Marlex polyethylene manufactured and sold by Philips Petroleum Company, etc.

The manner whereby the chemically cross-linked polyethylene, the form of particles, pellets, thin sheets, tape form, etc., may be subjected to the required milling action, may be varied widely employing the usual apparatus in milling operations. The equipment employed should be capable of causing a shearing action in the cross-linked polyethylene such as that found in the usual rubber compounding mills which have differential rolls operating at different speeds. The milling is advantageously carried out at temperatures of at least 75° C., for example, from about 80° to 150° C. or higher and usually above the melting point of the chemically cross-linked polyethylene. As rolling on the mill continues, it is generally desirable to widen the nip between the adjacent rolls of the mill to a point ranging from about $\frac{1}{16}$ inch to about $\frac{1}{4}$ inch or more to permit better distribution of the polyethylene product and also to avoid as much as possible undesirably affecting the cross-linked polyethylene as the result of the milling operation.

In general, the milling time may be varied within wide limits depending upon such factors as the physical state of the polyethylene (whether finely divided or larger size particles, pellets, sheet materials, etc.), the molecular weight of the polyethylene, the degree of cross-linking to which the polyethylene has been subjected, the molding equipment in which it is to be used (for example, compression molding, injection molding, extrusion, etc.), the application intended (for example, for making molded objects, such as bottles, other enclosures, insulated conductors, etc.), the temperature of the milling, etc. Generally, milling times from about 5 minutes to as much as two or more hours, preferably from about 15 minutes to 1 hour, are usually sufficient for effecting adequate milling of the cross-linked polyethylene to give a product which can be readily molded using the various molding techniques recited above. Persons skilled in the art will have little difficulty in determining the optimum milling times and temperatures which can advantageously be employed in each case in the practice of the present invention.

Obviously, other methods may be used to carry out the milling operation. Thus, it may be possible to put the cross-linked polyethylene through an extrusion machine employing a worm gear wherein a similar shearing action described above is exerted on the polyethylene. In connection with the use of extrusion operations, the cross-linked polyethylene, especially when in finely divided form, may be immediately charged into an extrusion apparatus and much of the prior milling eliminated and the shearing action in the extrusion machine used to take the place of the previous milling step. I prefer to employ either a Banbury mixer or compounding rolls used in the rubber industry for the milling operation for several reasons. Such types of equipment are readily available for the purpose. The use of such milling equipment will generally give optimum and most advantageous distribution of the cross-linked polyethylene. Finally, the use of such equipment permits the incorporation more readily of other materials which may be desirable to use with the cross-linked polyethylenes such as fillers, flame retardant agents, stabilizers, etc.

The milling step is critical for the practice of the present invention. Mere cross-linking of the polyethylene without the milling step will not yield smooth surfaces in the subsequently molded, e.g., extruded, product; in addition, there will be an undesirable distortion of the polyethylene if it should later be subjected to elevated temperatures; finally there will be an unsatisfactory knitting of portions of the molding compound, and the result will not be a coherent molded object. By means of the milling operation, all these difficulties are obviated or greatly minimized.

In order that those skilled in the art may better understand how the present invention may be practiced, the following examples are given by way of illustration and not by way of limitation. All parts are by weight.

The polyethylene employed in the following examples was a commercial grade of Bakelite DE-2400 of molecular weight of about 21,000.

EXAMPLE 1

About 96 parts of the above-mentioned polyethylene and 4 parts di-alpha-cumyl peroxide were mixed on a two-roll mill at about 125° C. The sheet thus obtained was placed in an oven at 175° C. for 15 minutes to effect curing of the polyethylene by the action of the peroxide. Thereafter, the cured (or cross-linked) polyethylene was milled on differential rolls for 45 minutes at about 125° C. The cured and milled resin was granulated and extruded onto #16 A.W.G. hard bare copper wire under the following conditions:

| | |
|---|---|
| Die temperature ° C | 230 |
| Front cylinder temperature ° C | 194 |
| Rear cylinder temperature ° C | 94 |
| Wire speed ft./min | 15 |
| Screw speed revolutions/min | 31 |

When a piece of insulation, about 3" long, was stripped from the wire and hung in an oven at 150° C. supporting its own weight, it shrank to 2" at once, indicating its elastic character and thereafter remained at this length for 94 hours. Inasmuch as conventional polyethylene when subjected to this test flows off the suspending clamp within a few minutes, it is apparent that a marked improvement in form stability at elevated temperatures had been achieved.

EXAMPLE 2

In this example, polyethylene was cured similarly as described in Example 1 with the exception that the amount of the peroxide used was 2%, by weight, based on the weight of the polyethylene. Otherwise the temperature and time of heating as well as milling conditions were essentially the same. A test piece of stripped insulation from the insulated conductor exhibited only slight flow at 150° C.

EXAMPLE 3

Bakelite DE-2400 polyethylene resin was mixed with varying amounts of a peroxide curing agent, specifically di-tertiary-butyl diperphthalate in amounts of 0.6%, 0.8%, and 1%, by weight, of the peroxide, based on the weight of the polyethylene. A Banbury mixer was used for this purpose and the mixer was operated at about 75 r.p.m. for about 2 minutes with steam (temperature about 121° C.) passing into the jacket surrounding the mixing chamber. The speed of the mixer was raised shortly after incorporation of the ingredients to 100 r.p.m. and the steam was turned on again raising the temperature from about 121° C. to around 177° C. Mastication of the cured resin at 100 r.p.m. was continued for about 25 minutes for a total elapsed time of 30 minutes. The Banbury product was sheeted on a mill and granulated. The granulated powders were then extruded on #16 A.W.G. bare annealed copper wire under the following conditions:

| | |
|---|---|
| Die ° C | 204 |
| Head ° C | 177 |
| Front cylinder ° C | 149 |
| Rear cylinder ° C | 93 |
| Hopper section | Water cooled |
| Screw | Water cooled |

The description of the actual extrusion machinery as well as the procedure for extrusion were as follows:

Screen pack _____ mesh__ 60–100–60
Screw speed _____ r.p.m__ 57
Wire speed _____ f.p.m__ 30
Die size _____ inches__ 0.120
Wall thickness _____ do____ 0.032

Examination of the wires coated in the above manner showed that the surface of the wire coating was very smooth when employing as insulation polyethylene cured with 0.6% of the peroxide; the surface was very slightly sandy when using 0.8% peroxide; and the surface was somewhat rough at 1% concentration of the peroxide. Smoothing agents such as organopolysiloxane gums may be incorporated in small amounts ranging from about 1 to 10%, by weight, of the polyethylene so that it may be possible to employ higher concentrations of the organic peroxide agent and still obtain smooth coatings.

The wire coatings prepared as in Example 3 were tested at high temperatures for form stability by suspending four-inch sections of the stripped insulations in an oven at 125° C. and measuring the lengths at various intervals of time. The following Table I shows the results of these tests:

Table I

| Concentration of peroxide | 0.6% | 0.8% | 1.0% |
|---|---|---|---|
| Percent of initial length: | | | |
| After 40 mins | 59 | 50 | 53 |
| After 5 hours | 61 | 50 | 53 |
| After 21 hours | 66 | 50 | 53 |
| After 92 hours | 69 | 50 | 53 |

It will be seen that form stability at 125° C. is possessed more constantly by the samples containing at least 0.8% peroxide. There is only slight flow at 0.6% peroxide concentration. It is apparent that if no peroxide has been employed, the polyethylene would have flowed rapidly from the test equipment. It should also be noted that for short exposures to high temperatures (about 125° C. to 150° C.) such as 1 hour or less, the 0.6% peroxide was adequate to make the flow negligible and perhaps even less peroxide could be used in such cases.

EXAMPLE 4

This example illustrates the use of various organic peroxides as cross-linking or curing agents for the polyethylene prior to the milling of the latter in the cured state. The general procedure for making the various mixtures of ingredients comprised compounding together 100 grams of the above-mentioned Bakelite polyethylene on a two-roll mill operated at about 30 p.s.i. steam (about 121° C.). Each formulation was prepared from 100 parts of the polyethylene and varying amounts of each of the peroxides tested. For convenience the peroxides used were identified as follows:

BP—Benzoyl peroxide
CHP—Cumene hydroperoxide
DCP—Dicumyl peroxide
DTBP—Di-tertiary-butyl peroxide
TBPB—Tertiary-butyl perbenzoate
DTBDP—Di-tertiary-butyl diperphthalate After incorporation of the peroxide in the polyethylene, the sheets obtained as a result of the milling action were oven-cured at 195° C. for 20 minutes. The degree of cure of each of the peroxide-containing polyethylene samples was tested by hanging on a wire a small sample 0.06" x 1" x 2" in an oven at 150° C. and observing the flow. The following Table II shows the results of these flow tests.

Table II

| Peroxide | | Flow Test at 150° C. (Sheet 0.06" x 1" x 2" hung on wire) |
|---|---|---|
| Type | Wt. Peroxide/100 grams Polyethylene | |
| TBPB | 0 | Flowed off within 30 seconds. |
|  | 1 | About to drop off wire in 10 min. |
|  | 2 | Sagged in 30 minutes. |
|  | 3 | Retained shape 30 minutes. |
|  | 5 | Do. |
| BP | 1 | Very slight sagging after 10 min. |
| CHP | 1 | Sagged in 5 minutes. |
| DTBP | 1 | Do. |
| DTBDP | 0.1 | Sagged in 10 minutes. |
|  | 0.3 | Very slight sagging after 10 min. |
|  | 0.5 | Retained shape 30 minutes. |
|  | 1.0 | Do. |

The above Table II shows a means for determining the degree of cross-linking to be induced by a variety of organic peroxides. This can be used as a guide by persons skilled in the art in determining the type of peroxide to be used for cross-linking purposes of the polyethylene prior to the milling action, as well as the amount of such peroxide.

The gel time temperature (which is an indication of the degree of cross-linking) was also determined for some of the peroxide-cured polyethylenes in a variety of peroxide concentrations after the peroxide-containing polyethylenes had been cured at 195° C. for 20 minutes in an oven, and milled for varying times at 125° C. This gel content was determined by continuously extracting the various milled samples with boiling toluene for a sufficient time until constant weight had been obtained. The gel content of samples which had not been subjected to the milling action was also determined. The following Table III shows the results of the gel content determinations.

Table III

| Time of Milling Treatment | Peroxide Type conc. (Percent) | Percent Gel | Extraction Time |
|---|---|---|---|
| None | DTBDP 0.1 | 7 | About 17 hours. |
|  | DTBDP 0.1 | 68 | |
|  | DTBDP 0.5 | 66 | |
|  | DTBDP 1.0 | 60 | |
| 45 minutes | DTBDP 0.5 | 70 | About 16 hours. |
| 75 minutes | DTBDP 1.0 | 50 | 17 hours. |
| None | TBPB 1 | 0 | 52 hours. |
|  | TBPB 2 | 33 | |
|  | TBPB 3 | 34 | |
|  | TBPB 5 | 50 | |
|  | TBPB 8 | 74 | |

Table III shows that no significant change in gel content is encountered as a result of the milling action although it does show too extensive milling actions, such as occurred in 75 minutes for the sample containing 1% of the di-tertiary butyl diperphthalate did give a somewhat lower gel content indicating that there may have been some breakdown in the gel content as the result of the extensive milling action.

EXAMPLE 5

In this example, Bakelite DYNH polyethylene resin was mixed with varying amounts of ditertiary-butyl diperphthalate (DTBDP) employing a Banbury mixer. Sheets of these three compositions were oven-cured at 175° C. for 50 minutes to cure the samples, and thereafter milled for varying lengths of time at about 125° C. similarly as was done in Examples 1 and 2. The milled samples were then granulated into small particles and compression-molded into sheets about 0.1" x 5" x 5" and into bars 0.5" x 0.5" x 5". The flow properties of these samples at 150° C. were tested by hanging samples thereof on a wire in a 150° C. oven. Table IV below gives the milling time on each of the samples, as well as the flow test results:

Table IV

| DTBDP Conc. (Percent) | Milling Time | Form | Flow Test at 150° C. |
|---|---|---|---|
| 0.1 | 35 | Sheet | Sagged in 10 min. and wire support began cutting through. |
| 0.3 | 35 | ---do--- | Sagged slightly in 30 min. and wire support began cutting through. |
| 0.5 | 45 | ---do--- | Very slight sagging and signs of cut through after 50 min. |
| 1.0 | 75 | ---do--- | No sagging or cut through in 6 hours. |
| 0.1 | 35 | Bar | 2½" elongation in 40 min. |
| 0.3 | 35 | ---do--- | 1¾" elongation in 50 min. |
| 0.5 | 45 | ---do--- | 1⅜" elongation in 200 min. |

It will, of course, be apparent to those skilled in the art that in addition to the solid polyethylene employed in the foregoing examples, other polyethylenes of different molecular weights and from different sources may be used without departing from the scope of the invention. In addition, it is intended within the scope of this invention to include not only the curing agents employed in the examples above but also to include other curing agents for polyethylene in varying concentrations (e.g., as high as 2 to 5%, by weight, of the polyethylene). Obviously, the molding and curing conditions may be varied widely as may the milling conditions within the scope of the invention herein described and claimed.

The degree of cure imparted may obviously be varied depending upon such factors as the curing agent used, the concentration of the curing agent, the type of polyethylene employed, the temperature and time at which cross-linking or curing is carried out, etc. Moreover, the degree of extrudability and moldability of the milled product may be varied depending upon the factors recited for the curing of the polyethylene as well as the milling conditions used. For optimum moldability including extrudability, I have found that the polyethylene is most advantageously of a molecular weight of between 18,000 to 35,000, the curing agent is an organic peroxide, the concentration of the curing agent is within the range of from about 0.3 to 5%, by weight, based on the weight of the polyethylene, the curing is carried out at a temperature of from about 100° C. to 200° C. for times ranging from about 30 seconds to 60 minutes or more, and the milling is advantageously carried out for periods ranging from about 10 minutes to about 2 hours at temperatures of the order of about 50° to 175° C.

By means of my invention it is possible to mold irregular shaped objects of desired thicknesses to obtain products whose properties, for instance, infusibility and insolubility as well as crack resistance under stressed conditions, are comparable to those of polyethylene which has been cured or cross-linked in situ, as, for instance, by chemical cross-linking or by irradiation of the finally formed object with high energy electrons.

The moldable cross-linked polyethylene resin included within the scope of the present invention may be employed for extrusion purposes, such as in making insulated electrical conductors, may be used to mold sterilizable containers and packaging material which can be heated at elevated temperatures without detrimetal effect, can be used to mold articles which require such properties as resistance to solvents, elevated temperatures, and exhibit resistance to cracking under stress in certain chemical environments, and, in general, can be employed in the fabrication of various objects which can be used to advantage the special properties resulting from the moderate degree of cross-linking induced by the curing of the polyethylene with the chemical curing agents. A particular advantage to be derived from the cured and milled polyethylene as a finely divided product lies in the fact that the subsequent fabrication may be economically feasible on a small scale whereas in the case of heat-treating a fabricated article of polyethylene already containing the curing agent, a relatively large volume of business in an individual article must be available in some cases to justify the large investment which may be involved and other processing facilities.

The moldable chemically cured polyethylene herein described may be extruded over electrical conducting cores so that advantage is taken of the non-sagging characteristics of the modified polyethylene of this invention. It may be desirable to obatin a tighter cure on the core by incorporating additional amounts of curing agents for the polyethylene, prior to extrusion on the conductor core, and the entire assembly subjected to heat either during or after the extrusion process.

What I claim as new and desire to secure by Letters Patent of the United States is:

1. The process for preparing a polyethylene which can be readily molded to yield products having decreased solubility and fusibility at elevated temperatures from polyethylene which has been chemically cross-linked to produce a material which cannot be readily molded, which process comprises milling the chemically cross-linked polyethylene by subjecting the latter to a shearing action at a temperature above 80° C. for a time in excess of 5 minutes.

2. The process as in claim 10 in which the chemical cross-linking agent is di-alpha-cumyl-peroxide.

3. The process as in claim 10 in which the chemical cross-linking agent is di-tertiary-butyl diperphthalate.

4. The process as in claim 10 in which the chemical cross-linking agent is tertiary butyl perbenzoate.

5. The process as in claim 10 in which the chemical cross-linking agent is benzoyl peroxide.

6. The process as in claim 10 in which the chemical cross-linking agent is cumene hydroperoxide.

7. The process for preparing an insulated conductor containing polyethylene insulation of decreased solubility and fusibility at elevated temperatures, which process comprises (1) milling polyethylene which has been chemically cross-linked to produce a material which cannot be readily extruded, said milling being accomplished by subjecting the cross-linked polyethylene to a shearing action at a temperature above 80° C. for a time in excess of 5 minutes and (2) extruding the milled cross-linked polyethylene over an electrically conducting metallic core.

8. The process which comprises milling polyethylene which has been chemically cross-linked to produce a material which cannot be readily molded, said milling being accomplished by subjecting the cross-linked polyethylene to a shearing action at a temperature above 80° C. for a time in excess of 5 minutes and thereafter incorporating in the milled cross-linked polyethylene an additional amount of an organic peroxy curing agent.

References Cited in the file of this patent

UNITED STATES PATENTS

| 2,528,523 | Kent | Nov. 7, 1950 |
| 2,628,214 | Pinkney et al. | Feb. 10, 1953 |
| 2,826,570 | Ivett | Mar. 11, 1958 |

UNITED STATES PATENT OFFICE
CERTIFICATE OF CORRECTION

Patent No. 2,919,474                       January 5, 1960

Quintin P. Cole

It is hereby certified that error appears in the printed specification of the above numbered patent requiring correction and that the said Letters Patent should read as corrected below.

Column 8, lines 33, 35, 37, 39 and 41, for the claim reference numeral "10", each occurrence, read -- 1 --.

Signed and sealed this 4th day of April 1961.

(SEAL)
Attest:     ERNEST W. SWIDER

Attesting Officer                                ARTHUR W. CROCKER
                                                          Acting Commissioner of Patents